E. E. & F. BEAN.
Wax-Thread Sewing-Machines.

No. 134,509. Patented Jan. 7, 1873.

Witnesses:
Myron A. Poole
James P. Gardner

Inventors:
Edwin E. and Frank Bean
by Alvan Andrew their atty.

3 Sheets--Sheet 2.
E. E. & F. BEAN.
Wax-Thread Sewing-Machines.
No. 134,509.          Patented Jan. 7, 1873.
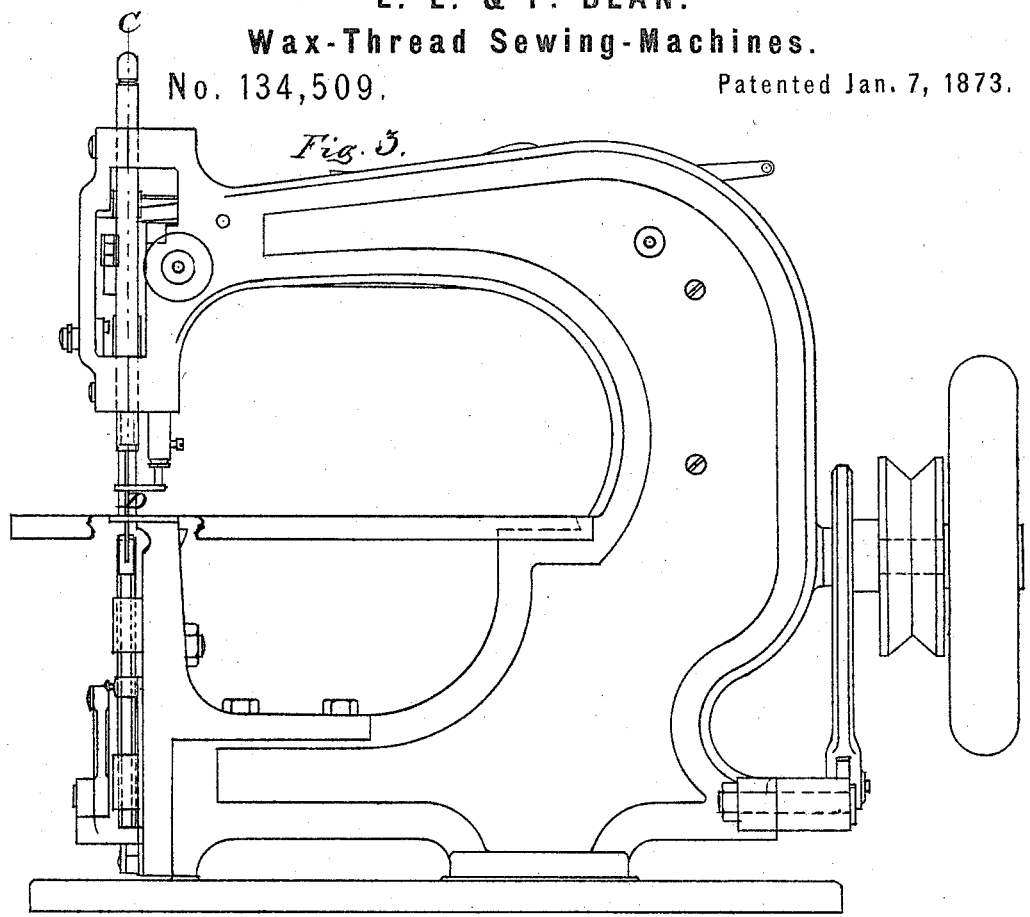
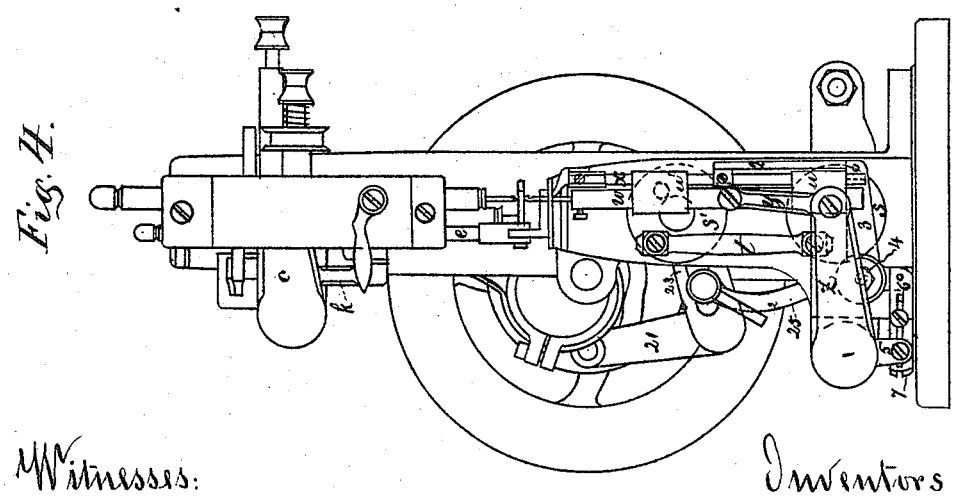
AM. PHOTO-LITHOGRAPHIC CO. N.Y. (OSBORNE'S PROCESS.)

3 Sheets--Sheet 3.

E. E. & F. BEAN.
Wax-Thread Sewing-Machines.

No. 134,509. Patented Jan. 7, 1873.

Witnesses:
Myron A. Cooley
James P. Gardner

Inventors:
Edwin E. and Frank Bean
by Alban Andrén their atty.

AM PHOTO-LITHOGRAPHIC CO. N.Y.(OSBORNE'S PROCESS.)

UNITED STATES PATENT OFFICE.

EDWIN E. BEAN, OF BOSTON, AND FRANK BEAN, OF MEDFORD, ASSIGNORS TO "THE CONSOLIDATED WAX-THREAD SEWING-MACHINE COMPANY," OF BOSTON, MASSACHUSETTS.

IMPROVEMENT IN WAX-THREAD SEWING-MACHINES.

Specification forming part of Letters Patent No. 134,509, dated January 7, 1873.

*To all whom it may concern:*

Be it known that we, EDWIN E. BEAN, of Boston, county of Suffolk, and State of Massachusetts, and FRANK BEAN, of Medford, in the county of Middlesex and State of Massachusetts, have jointly invented certain new and useful Improvements on Wax-Thread Sewing-Machines, of which the following is a specification:

Nature and Objects of the Invention.

The nature of our invention relates to certain improvements on wax-thread sewing-machines, consisting in devices for giving a variable and positive lift to the presser-foot, by which the presser-foot is raised almost the same height above the fabric, no matter what its thickness may be; also, in revolving disks, to which the needle-holder and cast-off are connected, by which arrangement the feed is obtained through the vertical, horizontal, and segmental motions of the needle; also, in the arrangement of two levers for the purpose of obtaining a simple and reliable adjustment of the throw of the needle; also, in a peculiar mechanism for operating the feed, as will be hereinafter fully shown and described.

Figure 1:
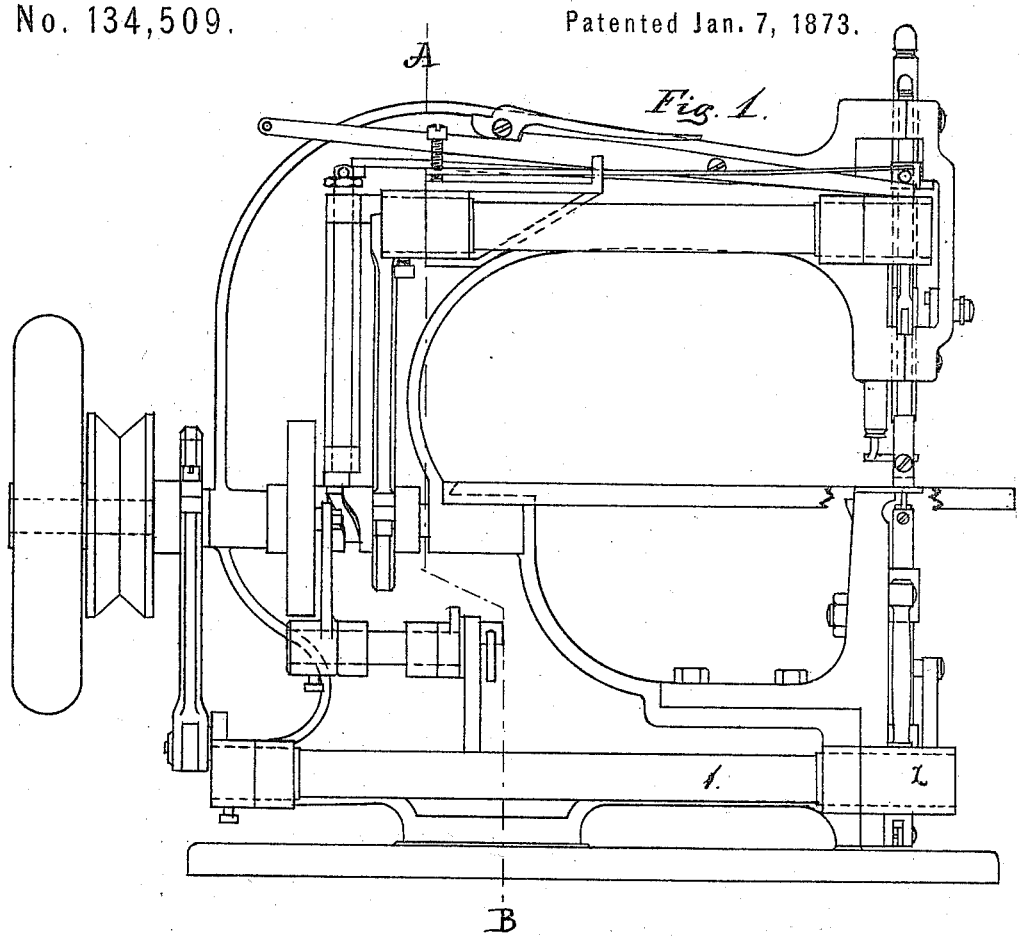
Figure 2:
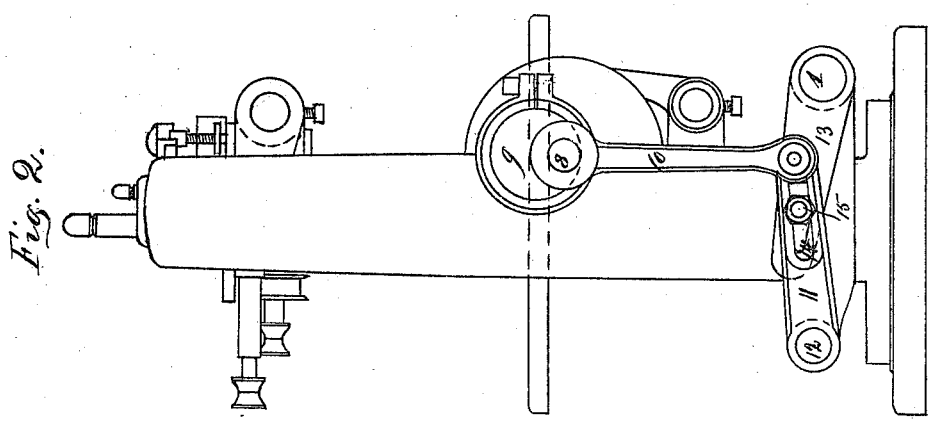
Figure 5:
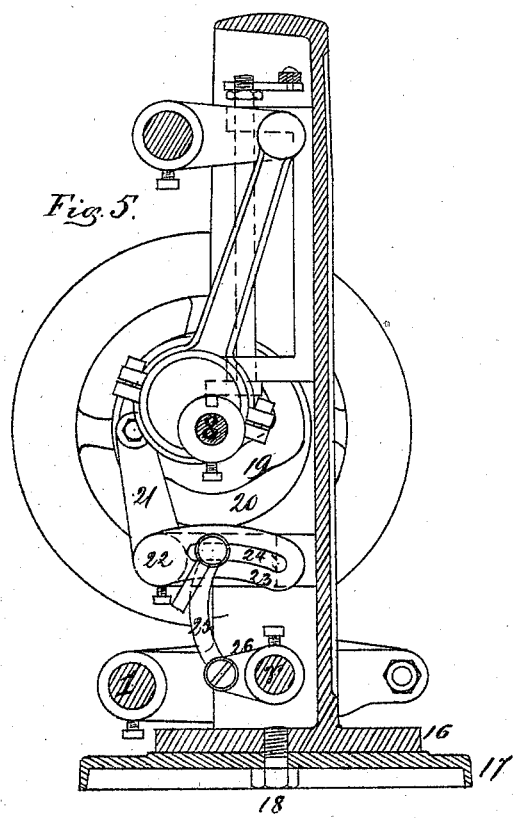
Figure 7:
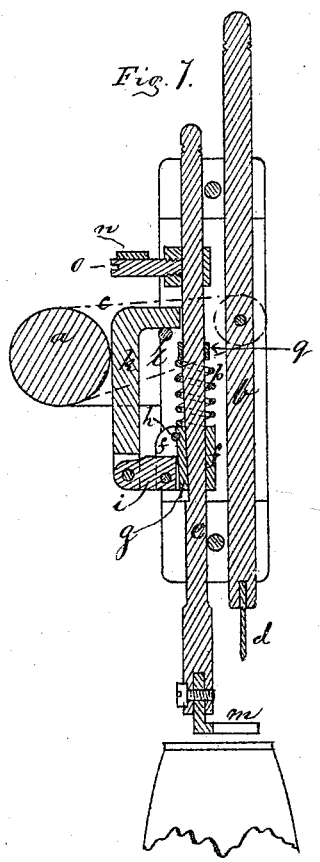
Figure 6:
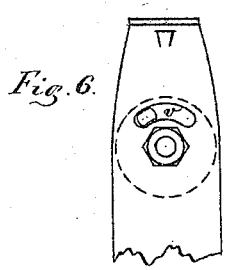

On the drawing, Figure 1 represents a side view. Fig. 2 represents an end view, from the end where the fly-wheel is placed. Fig. 3 represents a front view. Fig. 4 represents an end view from the end where the needle-holder is placed. Fig. 5 represents a cross-section on the line A B, Fig. 1. Fig. 6 is an inside view of the post, and Fig. 7 represents a longitudinal section on the line C D taken on Fig. 3.

Similar letters of reference refer to similar parts wherever they occur on the drawing.

Our invention is for wax-thread sewing-machines, for the purpose of sewing different kinds of boot and shoe, or leather-work generally, is light and compact, and the movable parts are very light and small, whereby we obtain less momentum and less strain on these parts when in motion, thus lessening the wear and tear of the machine in a great degree.

Description.

The variable and positive lift of the presser-foot is accomplished as follows: This arrangement is made in such a manner that the presser-foot is lifted above the fabric to about the same distance whatever may be its thickness, and not to a fixed amount, as common in other machines. Fig. 7 shows a longitudinal section of our arrangement for obtaining the variable but positive lift of our presser-foot. On that figure, $a$ is the rocking-shaft, by which the awl-holder $b$ is operated, by means of the crank $c$, shown in dotted lines. In the lower end of the awl-holder $b$ is the awl $d$, secured in the usual way. The middle part of the presser-foot holder $e$ is cut with a taper on one side, and embraced by a shoe, $f$, as shown. On the tapering side of the presser-foot holder $e$ is a plate, $g$, kept in close contact with it. The plate $g$ is supported by the pin $h$, attached to the sides of the shoe $f$, by which arrangement the plate $g$ is prevented sliding up or down out of the shoe $f$ during operation. A cam, $i$, is movable around a fulcrum in the shoe $f$, and the outer end of said cam $i$ is connected to a hooked arm, $k$, operated by means of a pin, $l$, attached to the crank $c$. The presser-foot $m$ is pressed down on the fabric by means of the flat spring $n$, acting on a pin, $o$, screwed firmly against the presser-foot holder $e$, as shown. The shoe $f$ is pressed down over the presser-foot holder $e$ by means of the coiled spring $p$, acting on a stationary bearing, $q$, as shown, as soon as the crank $c$ moves downward.

The operation of this, our positive and variable lift of the presser-foot, is as follows: When the crank $c$ moves downward, it relieves the hold of the pin $l$ on the hooked arm $k$, when the coiled spring $p$ makes the shoe $f$ slide easily downward over the presser-foot holder $e$, that is also pressed downward until it comes in contact with the upper side of the fabric, by means of the action of the flat spring $n$. As soon as the crank $c$ moves upward it raises the hooked arm $k$, whereby the cam $i$ is made to press against the plate $g$. Said plate $g$ is thus pressed hard against the tapering side of the presser-foot holder $e$, whereby a great friction is obtained between these parts, and the presser-foot holder $e$ is thus lifted up with the shoe $f$ until the crank $c$ moves down again, when the same operation is again repeated.

It is well here to say that we do not lift always a fixed amount over the upper side of the fabric, as the lower end of the taper on the presser-foot holder e is further away from the cam i than the upper end of said taper, whereby the cam i has to turn more to bind on the lower end of the said taper than what it has on the upper end; consequently, the thicker the fabric is, the less is the presser-foot holder lifted over the fabric, as herein fully described.

The rotating disks for the operation of the feed of the needle and cast-off operate as follows: A horizontal shaft, r, is shown in section on Fig. 5. This shaft is made to rock forward and back around its center by connections, as will hereafter be described. On the forward end of said shaft r a round disk, s, is keyed, which is connected to an upper disk, s', by means of the connecting-rod t, shown in Fig. 4, by which arrangement the disks s s' are made to rock together around their centers. To the disks s s' are attached guide-blocks u u', made to turn around bolts put through the disks s s'. In Fig. 6 is shown a curved slot-hole, v, in which the bolt attached to the disk s' is made to move to either side. The guides u u' are bored through with two holes, one of which serves as a guide for the needle-holder w, and the other for the cast-off holder x. A vertical motion is given to the needle-holder w by means of the link y attached to it, the lower end of which is connected to the crank z that is operated by means of the rocking-shaft 1. The cast-off holder x is given a vertical motion by means of the link 2, Fig. 4, the lower end of which is connected to a lever, 3, movable around the fulcrum 4. The lever 3 is provided with a knee that projects downward from the fulcrum 4, and a similar knee, 5, projects downward from the crank z. Between said knees are adjustable connecting-links 6 and 7, from which the motion of the cast-off holder x is conducted from the crank z.

The operation of this feed-motion is as follows: The crank z rocks up and down, and by the arrangement of the connecting-rod y a vertical motion is given to the needle-holder w, at the same time that a horizontal and circular motion is given to the said needle-holder through the rocking motion of the disks s s'. The cast-off holder is simultaneously given a vertical motion by means of the rocking-lever 5, connections 6 7, lever 3, and link 2, and a motion like the needle-holder's is given to it through the disks s s' and guides u u'.

Thus, it will be seen that we obtain our feed for the needle and cast-off simply by the motion of a few very light parts, instead of moving a heavy part or other heavy details.

The arrangement of two connected levers for the purpose of adjusting the throw of the needle and cast-off is as follows, and is shown mainly in Fig. 2: Where 8 is the driving-shaft on which the eccentric 9 is keyed, the eccentric 9 has a downward-projecting arm, 10, the lower end of which is jointed to the end of a lever, 11, that is made to move around the stud 12, as shown. On the rocking-shaft 1 is keyed another lever, 13, as shown. Both levers 11 and 13 are provided with slot-holes 14, as shown, through which the connecting-stud 15 is inserted and held by a nut or similar mechanism. From this it will be seen that, as the throw of the eccentric 9 is always the same, if we move the stud 15 nearer the fulcrum 12, we decrease the throw of the rocking-levers 13 and z, and consequently also decrease the throw of the needle and cast-off. When we move the stud 15 nearer to the fulcrum 1 we increase the throw of levers 13 and z, and also increase the throw of the needle and cast-off.

The advantage we obtain by the use of two connected levers, 11 and 13, instead of only one, is that we do not change the angular deflection of the eccentric rod 10, no matter how large or how small the throw of the needle and cast-off.

The sewing-machine frame is provided with a sole-plate, 16, that rests upon a table, 17, as shown. A screw, 18, projects through the table 17, and is screwed through the sole-plate 16, by which arrangement the whole machine can be turned on a horizontal plane around the bolt 18 simply by unscrewing said bolt. The machine can again be firmly attached to the table 17 by tightening up the screw 18. This is a very practical and labor-saving arrangement, when it is necessary to get access to all parts of a machine for the purpose of repairing the same, as may from time to time be required.

The mechanism for operating the feed of the needle and cast-off is mainly shown in Fig. 5. On the driving-shaft 8 is secured a grooved cam-disk, 20, provided with an eccentric groove, 19, as shown. The groove 19 operates a rocking-lever, 21, secured to a rocking-shaft, 22, to which is also secured a curved lever, 23, provided with a curved slot-hole, 24, as shown. The upper end of the link 25 is made so as to be connected at any part of the slot-hole 24. The lower end of said link 25 is connected to a crank, 26, securely attached to the rocking-shaft r. On the end of the rocking-shaft r is keyed the circular disk s, as heretofore described.

From the above it will be seen that the feed of the needle and cast-off can easily be regulated simply by moving the upper end of the link 25 nearer or further from the shaft 22 in the slot-hole 24.

Having thus fully described the nature, construction, and operation of our invention, we wish to secure by Letters Patent, and claim—

1. The mechanism for operating the presser-foot holder e, consisting in the shaft a, crank c, pin l, hooked link k, cam i, spiral spring p, plate g, and shoe f, as herein set forth and described.

2. The revolving disks s s', in combination with the link t, guides u u', and needle-holder w, and cast-off holder x, as and for the purpose set forth.

3. The mechanism for operating the disks $s\ s'$ and needle-holder $w$ and cast-off holder $x$, consisting of the rocking-shaft 1, crank $z$, link $y$, lever 3, link 2, crank 5, and connections 6 and 7, as and for the purpose set forth.

4. The arrangement of the slotted levers 11 and 13 and stud 15, in combination with the eccentric 9 and rod 10, for operating and adjusting the throw of the needle and cast-off, as fully set forth and described.

5. The mechanism for operating the needle to feed or move the material, consisting of the curved slotted rocking-lever 23, link 25, crank 26, and rocking-shaft $r$, in combination with the revolving disks $s\ s'$, as and for the purpose herein set forth and described.

EDWIN E. BEAN.
       FRANK BEAN.

Witnesses:
 ALBAN ANDRÉN,
 ALBERT H. OSTBURG.